United States Patent
Smithwick

(10) Patent No.: US 9,916,794 B2
(45) Date of Patent: Mar. 13, 2018

(54) SWITCHED EMISSIVE TRANSPARENT DISPLAY WITH CONTROLLABLE PER-PIXEL OPACITY

(71) Applicant: DISNEY ENTERPRISES, INC., Burbank, CA (US)

(72) Inventor: Quinn Y. Smithwick, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 140 days.

(21) Appl. No.: 14/818,519

(22) Filed: Aug. 5, 2015

(65) Prior Publication Data
US 2017/0041598 A1 Feb. 9, 2017

(51) Int. Cl.
G09G 3/34 (2006.01)
G09G 3/00 (2006.01)
H04N 13/04 (2006.01)

(52) U.S. Cl.
CPC ........ *G09G 3/3406* (2013.01); *G09G 3/003* (2013.01); *H04N 13/04* (2013.01); *G09G 2300/023* (2013.01); *H04N 2213/006* (2013.01)

(58) Field of Classification Search
CPC ........ H04N 513/0497; H04N 13/0422; H04N 13/0488; H04N 13/0404; G09G 3/3607; G09G 3/3406
See application file for complete search history.

(56) References Cited

U.S. PATENT DOCUMENTS

| | | | | |
|---|---|---|---|---|
| 4,796,979 A * | 1/1989 | Tsuboyama | ....... | G02F 1/133711 349/129 |
| 5,796,509 A * | 8/1998 | Doany | .............. | G02F 1/133603 359/254 |
| 6,069,649 A * | 5/2000 | Hattori | ............... | H04N 13/0404 348/42 |
| 6,257,727 B1 * | 7/2001 | Melville | ................ | G02B 27/01 353/28 |
| 6,377,229 B1 * | 4/2002 | Sullivan | ............. | G02B 27/2278 345/424 |
| 6,481,851 B1 * | 11/2002 | McNelley | ........... | G02B 27/2292 345/5 |
| 2003/0214459 A1 * | 11/2003 | Nishihara | .......... | H04N 13/0409 345/6 |
| 2007/0069974 A1 * | 3/2007 | Kawata | ............. | G02F 1/133606 345/1.1 |

(Continued)

*Primary Examiner* — Mihir K Rayan
(74) *Attorney, Agent, or Firm* — Marsh Fischmann & Breyfogle LLP; Kent A. Lembke

(57) ABSTRACT

A display system adapted to use rapid switching techniques to switch between displaying content and displaying a mask for that content so as to provide per-pixel opacity control. The display system may employ rapid synchronized switching of both a non-emissive, transparent display and a transparent backlight. In a first state, the display is operated to display content with the backlight acting as a scattering luminous backlight. In the other or second state, the display is operated to display one or more masks (for some or all objects or items of the content displayed in the first state) with the backlight functioning as a clear and unlit backlight. The display system is capable of producing opaque emissive content on a transparent field to provide a novel display and/or for use in compact spatial augmented reality applications.

27 Claims, 7 Drawing Sheets

(56) References Cited

U.S. PATENT DOCUMENTS

| | | | |
|---|---|---|---|
| 2008/0284925 A1* | 11/2008 | Han | G06F 3/0425 349/12 |
| 2010/0165084 A1* | 7/2010 | Liou | G09G 3/003 348/54 |
| 2011/0164047 A1* | 7/2011 | Pance | G06F 1/1647 345/581 |
| 2012/0313839 A1* | 12/2012 | Smithwick | G02B 27/2214 345/6 |
| 2013/0069933 A1* | 3/2013 | Smithwick | G02B 27/2214 345/419 |
| 2013/0300728 A1* | 11/2013 | Reichow | G09G 3/36 345/419 |
| 2014/0118336 A1* | 5/2014 | Smithwick | G02B 27/2214 345/419 |
| 2014/0192281 A1* | 7/2014 | Smithwick | G02F 1/1313 349/15 |

* cited by examiner

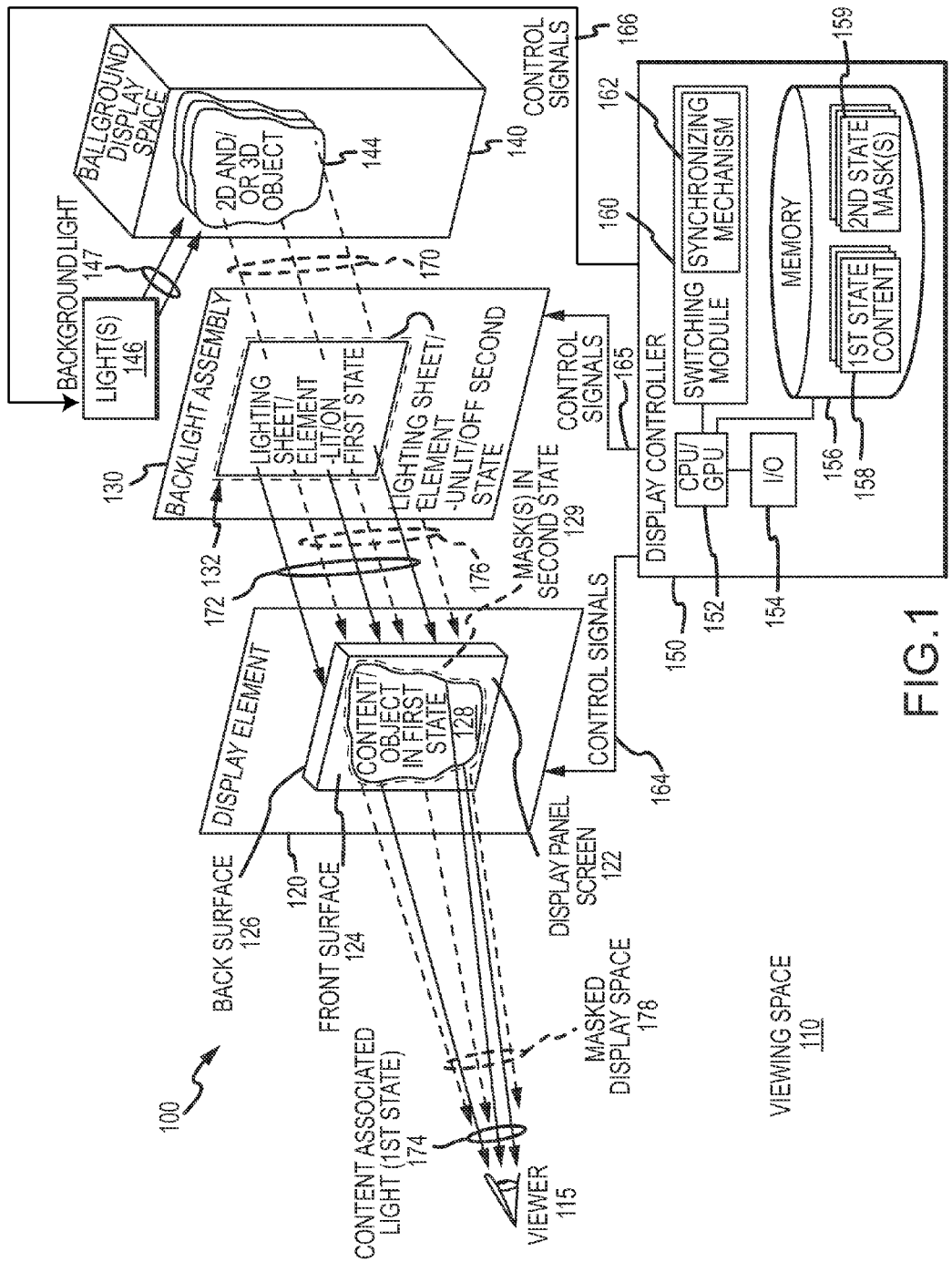

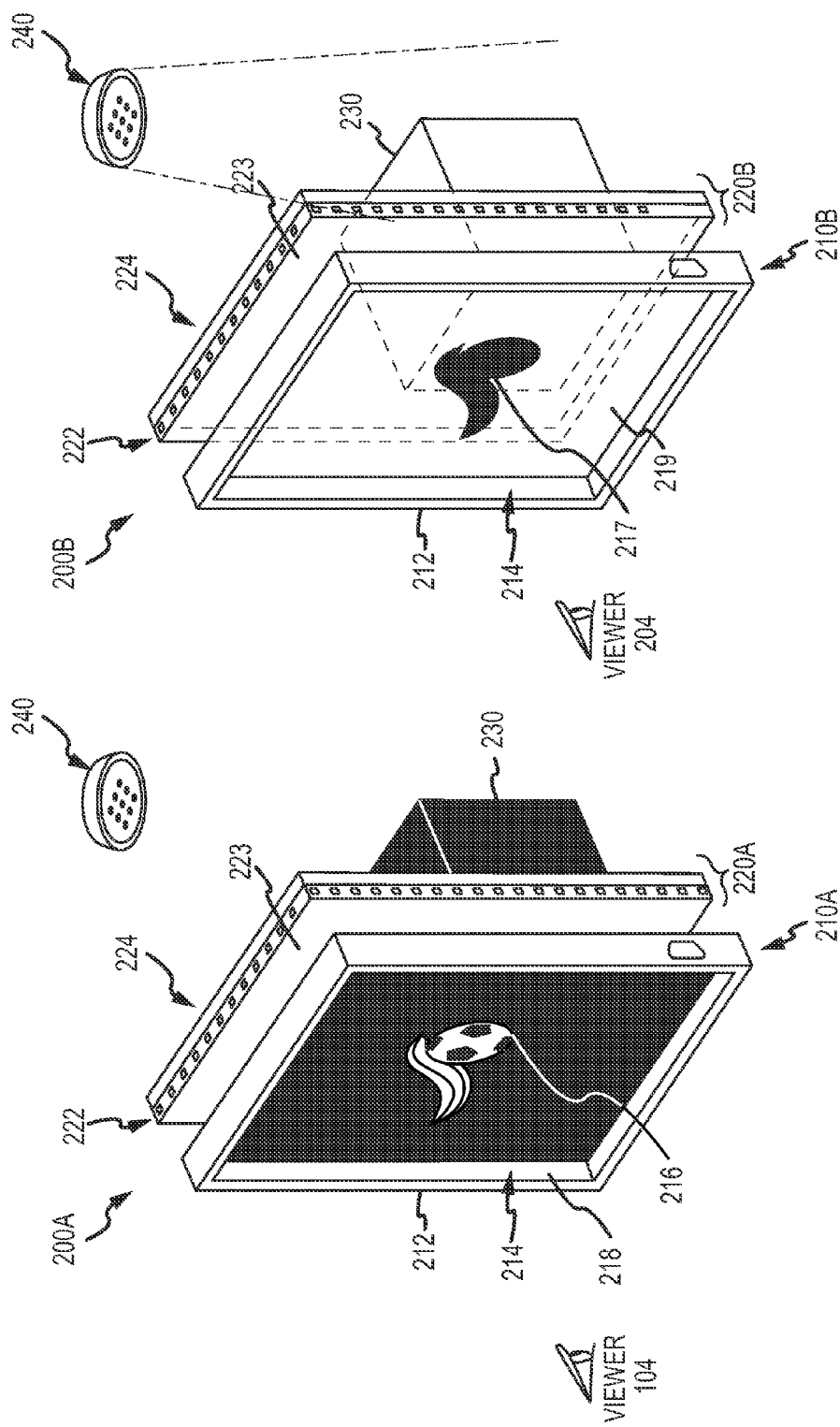

SWITCHED EMISSIVE TRANSPARENT DISPLAY WITH CONTROLLABLE PER-PIXEL OPACITY

BACKGROUND

1. Field of the Description

The present description relates, in general, to three dimensional (3D) display methods and devices (e.g., methods and devices for creating and augmenting differing views of objects and their background in differing directions without regard of eye position and without need for head-mounted gear to view a 3D effect), and, more particularly, to 3D or volumetric displays that combine multiple emissive and light modulating planes that are adapted to provide views of objects with opacity against other objects or background that can be controlled on a pixel-by-pixel basis (e.g., provide controllable per-pixel opacity).

2. Relevant Background

Displays that provide the illusion of three dimensions (3D) have become increasingly popular in many entertainment settings from movie theaters to venues such as amusement parks, shopping malls, and the like to home viewing with advances in televisions, computer monitors, video game systems, transparent displays, and interactive windows. The trend toward 3D display devices is likely to continue and is being driven in part by the increasing amount of 3D content available for movies, television, and video games.

While the majority of 3D displays currently require that the audience or viewers wear special glasses, there has recently been significant research toward autostereoscopic and automultiscopic displays. In automultiscopic display systems, techniques are used to display 3D images that can be viewed without the use of special headgear or glasses. It is generally agreed within the entertainment industry that automultiscopic displays unencumbered by glasses offer significant advantages over other 3D displays. Technological progress has been made in providing automultiscopic displays with improved resolution and user-perceived quality, and such progress may soon lead to more widespread adoption of automultiscopic displays as long as issues with occlusion and limitations on user viewing positions can also be addressed.

A volumetric display is one of the main types of 3D display that is currently used to provide an automultiscopic experience. Volumetric displays provide images of 3D objects with correct focus and depth cues by creating a volume of individually controlled light sources. Volumetric displays typically operate by superimposing translucent light emitters, and, as a result, a key disadvantage with volumetric displays is that they cannot represent occlusion or view-dependent effects (e.g., a viewer can often see objects behind a displayed foreground image instead of the foreground image occluding or blocking the object from view). In conventional volumetric displays, all voxels that are occluded by other voxels in an input 3D model are visually merged since there are no mechanisms to block the light and provide proper occlusion.

A variety of display systems and devices have been developed to try to provide improved 3D displays that include and augment the physical background environment while not requiring viewers to wear special glasses or headgear. For example, displays have been developed that in some cases can control each pixel's color, luminance, and opacity, and these displays include Pepper's Ghost display systems, scrim projection-based systems, and transparent organic light-emitting diode (OLED) displays with transparent liquid-crystal display (LCD) masks. While effective, the masked Pepper's Ghost display system requires a large beam combiner creating a large footprint. The masked scrim projection-based system has a small physical footprint, but it needs space for projection throw. Transparent OLED displays with co-located LCD masks have a minimal footprint and allow for direct interaction with the display surface. Unfortunately, current commercial transparent OLED displays are limited in size (2"×2"), and larger research displays (e.g., displays that are greater than 15 inches diagonal) are unavailable outside the laboratory.

Additionally, a switching dual layer display system has been developed in which a foreground display was used to present opaque emissive content on a transparent field, independent of the content on the background display. In this display system, the components are rapidly switched between two states: (1) a foreground transparent LCD panel presenting its content with a background display presenting a white field acting as a global backlight; and (2) the foreground display presenting a content mask with the background display presenting its content. The foreground display's pixels exhibit controllable color, luminance, and opacity, but one drawback of such a system is that it requires and depends upon the background display.

Hence, there remains a need for improved 3D displays (or display systems) and automultiscopy display methods that can better handle occlusions and other issues limiting use of such displays such as limited number of viewers/viewpoints, specific and tight viewer positioning requirements, and aliasing artifacts. Preferably, such 3D display systems would be configured to try to replicate the abilities and compactness of 3D systems with a transparent OLED display and LCD mask.

SUMMARY

The present description teaches 3D display systems or assemblies that address the above problems. Particularly, the 3D display systems taught herein are adapted to use rapid switching techniques to switch between displaying content and a mask for that content to provide desired per-pixel opacity but without the need for a background display providing content, which allows physical backgrounds to be visible behind the switched transparent display element and any backlight components provided in the display system. The display system can replicate abilities and compactness of a system using a transparent OLED display and transparent LCD mask while making use of a much larger, readily-available transparent LCD panel (as the switched transparent display element) combined with switched transparent backlight elements (e.g., a backlight assembly).

In brief, a display system or assembly of the present description may be thought of (or labeled) as an emissive transparent display with per-pixel opacity. The display system may employ rapid synchronized switching of both a transparent display and a transparent backlight. In a first state, the display is operated to display content with the backlight acting as an opaque or scattering luminous backlight. In the other or second state, the display is operated to display one or more masks (for some or all objects or items of the content displayed in the first state) with the backlight functioning as a clear and unlit backlight. The switching is "rapid, e.g., a switching rate or speed of 120 Hz or frames per second (fps) or faster (i.e., each state in a two state switching scheme occurs at least 60 times per second), and, in one exemplary embodiment, a 144 fps, transparent LCD panel is used in conjunction with a transparent backlight and controllably blocking or diffusive smart glass (or switchable glass) screen (e.g., the transparent backlight and smart glass are part of a backlight assembly). The display system is capable of producing opaque emissive content on a transparent field to provide a novel display and/or for use in compact spatial augmented reality applications.

More particularly, a display system is provided that includes a display element including a non-emissive display panel, a backlight assembly, and a display controller. During system operations, the display controller operates (e.g., by generating control signals) to switch operations of the display element between first and second operating states and to switch operations of the backlight assembly between first and second operating states. To provide a unique 3D effect, the non-emissive display panel displays content in the first operating state of the display element and displays a mask for the content in the second operating state of the display element. Additionally, the backlight assembly is luminous in the first operating state of the backlight assembly to direct light onto a surface of the non-emissive display panel and is transparent in the second operating state of the backlight assembly.

Also, to achieve a useful 3D effect/display, the controller synchronizes switching of the operations of the display element and the backlight assembly whereby the first operating states of the display element and the backlight assembly at least partially overlap and the second operating states of the display element and backlight assembly at least partially overlap. Further, it is typically preferable that the backlight assembly is opaque to the background during the first operating state of the backlight assembly. To this end, the backlight assembly may include a ferroelectric, electrochromic, PDLC, or other smart glass panel that is controlled to be opaque in the first operating state of the backlight assembly and to be transparent in the second operating state.

In a first implementation of the display system, the backlight assembly includes an edge lit particle-embedded plastic sheet positioned between the surface of the non-emissive display panel and the smart glass panel. In this first implementation, the edge lit particle-embedded plastic sheet is operable to be luminous in the first operating state of the backlight assembly and to be transparent in the second operating state of the backlight assembly.

In a second implementation of the display system, the smart glass panel is spaced apart and parallel to the surface of the non-emissive display panel. Further, this second implementation also includes a beamsplitter at a 45 degree angle between the smart glass panel and the non-emissive display panel. A standard LED/CCFL backlight assembly can be positioned to be perpendicular to the surface of the non-emissive display panel and the smart glass panel, such that its light is reflected off the beamsplitter and evenly illuminates the non-emissive display panel. In this second implementation, the backlight assembly is operable to be luminous and opaque to the background in the first operating state and to be unlit and transparent to the background respectively in the second operating state of the backlight assembly.

In a third implementation of the display system, the smart glass panel is spaced apart and parallel to the surface of the non-emissive display panel. Also, the backlight assembly further includes a light source positioned to direct output light onto a surface of the smart glass panel distal to the surface of the non-emissive display panel. Further, the light source is operated to provide the output light during the first operating state of the backlight assembly and to be non-luminous during the second operating state of the backlight assembly.

In a fourth implementation of the display system, the smart glass panel is spaced apart and parallel to the surface of the non-emissive display panel. In this implementation, the backlight assembly includes a quad-lenticular stack between the smart glass panel and the surface of the non-emissive display panel. Further, the quad-lenticular stack is edge lit to be luminous in the first operating state of the backlight assembly and to be non-luminous in the second operating state of the backlight assembly.

In some implementations of the display system, the non-emissive display panel comprises a transparent liquid crystal display (LCD). To provide desirable imagery, the controller switches the operations between the first and second operating states at a switching rate of at least 120 Hertz (Hz). Further, to provide pixel-by-pixel opacity control, the content can be displayed via operation of a set of pixels of the non-emissive display panel, and the mask can then be displayed via all or a subset of the pixels of the non-emissive display panel. In this way, pixel-by-pixel opacity is defined by the mask, and the mask is aligned with at least a portion of the content on the non-emissive display panel. With such pixel level control in the display panel, it may be useful to display the content by operating the set of pixels to display color and to display the mask by using a color or gray scale for the same (or a smaller subset of the) pixels used to display the color content.

BRIEF DESCRIPTION OF THE DRAWINGS

FIG. 1 is a functional block diagram or schematic of a display system of the present description;

FIGS. 2A-2C illustrate front perspective views of a display system operating in a first state (or State A), in a second state (or State B), and with rapid switching between the first and second states (State A to State B to State A to State B and so on over an operating period);

DETAILED DESCRIPTION

Figure 2C:
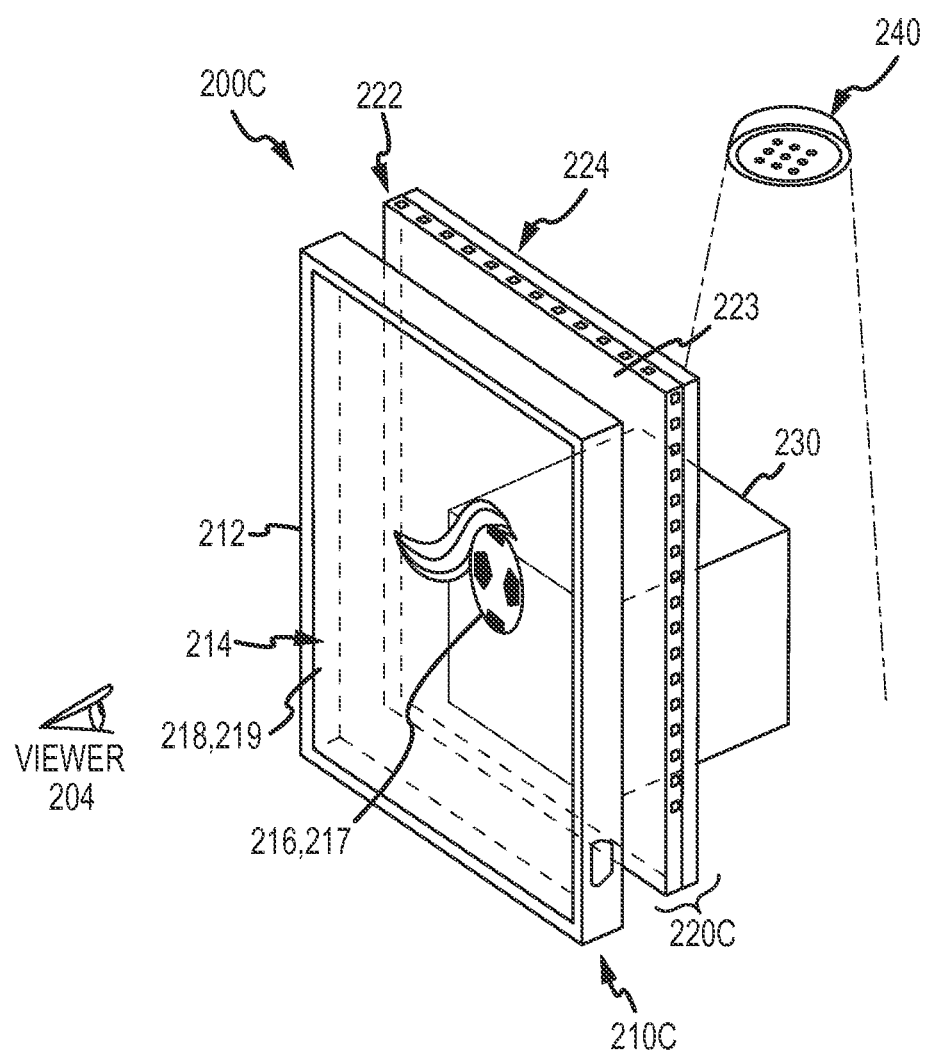

Briefly, the following description is directed toward a switched emissive transparent display system or assembly that is adapted to provide controllable per-pixel opacity. The display system includes a display element that has a screen/panel switchable between a first state in which it is operated to display content and a second state in which it displays one or more masks for one or more objects/items in the displayed content. The displayed masks may be wholly opaque or only partially opaque, e.g., a displayed mask may be used to define a level or amount of opacity on a per-pixel basis in the display panel/screen. In other areas or portions of the display element, the screen/panel is transparent (which is intended to mean translucent to transparent to light, with more transparent being preferred).

The display system also includes a backlight assembly that is adapted to operate in a first state (concurrent with operation of the display element in its first state) to be lit or "on" to provide light to the back surface of the display screen/panel. In a second state (concurrent with operation of the display element in its second state) to be unlit or "off" to provide no (or little) light to the back surface of the display screen/panel and to also be transparent (again, this is intended to mean translucent to transparent to light) or at least include a transparent portion adjacent or behind the back surface of the display panel/screen. In this way, during the second states of these two components, a viewer can see through the display screen/panel and backlight assembly (or portion positioned behind the panel/screen), and a background scene/space with one or more 2D or 3D objects may be viewed by a viewer looking through the display panel/screen and backlight assembly except at locations where a mask(s) is displayed. In this manner, the 3D display system can be used to provide a unique 3D effect (e.g., a trophy display, a merchandise display, a digital window, and so on) that can be enjoyed by a viewer without the need for special 3D glasses.

Many futuristic display concepts from movies such as action and science fiction movies involve transparent imagery with colorfully emissive yet opaque content, and those in the entertainment and other industries have a strong and growing interest in physically creating such effects with display systems. As just one example, such a display system would be useful in allowing synthetic characters to be placed amongst physical objects in a real-world, background scene (e.g., to provide a compact Pepper's Ghost assembly). In these cases, the ability to control opacity in a transparent display element used to display the synthetic characters is important, otherwise the displayed content or character would be also appear semi-transparent and low contrast against bright busy background environments.

However, it will be understood by those skilled in the display arts that practical implementation of such a display is difficult. Each pixel of such a display would preferably have not only a color, e.g. R: red, G: green, B: blue components, and emissive luminance/brightness, e.g. R,G, B=[0, 1, ..., 255], but also an absorption/opacity, e.g. $\alpha$=[0, 1, ..., 255]. The display system would be considered a color transparent emissive display with real-world optical alpha (or per-pixel variable transparency). Current display devices are configured with pixels that control only two out of the three variables. For example, the pixels of a transparent LCD panel vary color and opacity but not emissive luminance as transparent LCD panels do not generate their own light. Similarly, transparent OLED display devices may vary color and luminance but do not control opacity as OLED display devices do not modulate background light. As a result, content displayed on currently available transparent displays is low-contrast and semi-transparent and the background affects the appearance of the displayed content.

The inventor recognized that a display system was needed that could provide pixels that can vary in color, luminance, and opacity (e.g., RGB$\alpha$). Further, in some embodiments, the inventor determined that the display system should be able to accept four data component signals (or six data components with an independent alpha channel for each color channel). However, typical video signals have only three data components (RGB).

Since common displays are only able to control two out of the three desired variables of luminance, color and opacity, the display systems taught herein temporally multiplex opaque-emissive content (i.e., to control tint color and luminance on a pixel-by-pixel basis) and transparency with absorbing masks (i.e., to control color and transparency on a pixel-by-pixel basis). In some prototyped embodiments, the display system employs rapid synchronized switching of a transparent LCD display (which is the switchable transparent display element of the system) and a transparent backlight (which is the switchable backlight assembly of the system) between a first state providing displayed content with a scattering-luminous backlight and a second state with a displayed mask and a transparent and nonluminous (unlit) backlight. To implement this scheme in a display system, a 120 fps (or greater) transparent LCD panel as the display element can be used in conjunction with a variety of transparent backlight assemblies, with a representative but non-limiting group of backlight assemblies being described herein.

FIG. 1 illustrates a display system 100, with a functional block diagram, during operation of the system 100 to provide a 3D display or effect to a viewer 115 positioned in a viewing space 110. The display system 100 includes a display element 120 with a display panel or screen 122 with a front surface 124 and a back surface 126. The display panel 122 may be a planar component and be arranged in the system 100 with the front or first surface 124 facing or exposed to the viewing space 110 and viewer 115 and with the back or second surface 126 facing away from the viewing space 110 and toward a backlight assembly 130. The display panel 122 is adapted for operation in a first state to display content (or objects) 128 visible via its front surface 124 as shown with content-associated light 174 being transmitted into the viewing space 110 and to the viewer 115 (or their eyes).

The display panel 122 is further adapted for operation in a second state to display one or more masks 129 and to otherwise be transparent (e.g., areas or portions of the panel 122 not displaying a mask 129 are translucent to (more preferably) transparent to light). The masks 129 define opacity of the panel 122 on a pixel basis and may be black or opaque or be adapted for providing less opacity (or more light transmission) such as by providing all or portions of the mask with a value on the grayscale or the like. While not a requirement, the masks 129 typically are positioned in a location matching that of all or portions of an object in the content 128, and the masks 129 often are sized and shaped to match such objects in the content 128, e.g., to display an opaque soccer ball, the mask 129 would be sized and shaped similar to that of the soccer ball's silhouette provided in the content 128 and the same pixels would be used to alternately display content 128 and mask 129.

To this end, the display panel 122 is chosen to rapidly switch (e.g., at a rate of 120 fps or faster) between these two display or operating states such as in response to control signals 164 from a display controller 150. The display panel/screen 122 may take a number of forms to practice the system 100 and provide such switching functionality. In some preferred embodiments, the display panel/screen 122 is a transparent LCD that can switch at 120 fps while other embodiments utilized a transparent LCD that can switch at 144 fps or faster between displaying content 128 (and being non-displaying (e.g., black) in other areas/regions) and displaying a mask 129 (and being transparent (e.g., white) in other areas/regions).

Since the display element 120 is absorptive and does not provide luminance in the system 100, the system 100 includes a backlight assembly 130 with a lighting sheet or element 132 that is configured to selectively provide backlighting 172 to the back surface 126 of the display panel 122 of the display element 120. The light sheet or element 132 may be sized and shaped to match the size and shape of the display panel 122 but this is not a requirement of the system 100, and the light sheet or element 132 may be positioned with its light-outputting surface or side abutting the back surface 126 to provide a compact display system 100 or may be spaced apart from the surface 126 (e.g., when the lighting sheet or element 132 is smaller in size than the display panel 122 to provide the light 172 to all of the back surface 126).

The backlight assembly 130 is adapted to respond to control signals 165 from the display controller 150 to switch rapidly (e.g., 120 to 144 Hz or faster) between first and second operating states. In the first operating state (which may wholly or at least partially coincide with the first operating state of the display panel 122 of the display element 120), the lighting sheet/element 132 outputs the backlighting 172 to the back surface 126 of the display panel 122, which causes the displayed content 128 to be visible to the viewer 115 in viewing space 110 as shown with light 174 from the display element 120. In the second operating state (which may wholly or at least partially coincide with the second operating state of the display panel 122 of the display element 120), the lighting sheet/element 132 is unlit (or nonluminous) and also transparent (or substantially so) to light, which allows light 170 from a background display space 140 to pass through the sheet/panel 132 as shown at 176 to strike the back surface 126 and pass through the unmasked portions/areas of the display panel 122 as shown with masked display space light 178 reaching the viewer 115 (or their eyes). In other words, the lighting sheet is "on" (or lit) in the first state to provide the light 172 to the display panel 122 and is "off" (or unlit) in the second state such that it is not luminous and is also transparent (e.g., to light 170 from background objects 144). The backlight assembly 130 may take many forms to provide these functions, and a number of exemplary and useful backlight assemblies are described below that may be used for the backlight assembly 130.

The display system 100 further includes a background display assembly or space 140 that is provided, relative to the viewing space 110, behind both the display panel 122 and the lighting sheet 132 of the backlight assembly 130. Stated differently, the lighting sheet or element 132 is sandwiched between the display panel/screen 122 and the background display space or assembly 140. To provide a desirable 3D effect for viewer 115 in viewing space 110, it may be desirable to provide one-to-many 2D and/or 3D objects 144 in the display space 140 that can be viewed concurrently with the displayed content 128. One or more lights 146 may be provided to illuminate the objects 144 with background light 147. This light 147 is reflected from the surfaces of the objects 144 as shown at 170 and, in the second operating state of the backlight assembly 130 is transmitted through the transparent lighting sheet or element in its unlit or off state.

The light 176 is then transmitted to the back surface 126 of the display panel 122 which is transparent except for one or more masks 129 in its second operating state such that the light 178 is transmitted to the viewer 115 from areas or regions of the front surface 124 of the display panel 122 that are not displaying a translucent-to-opaque mask 129. The light 146 may always be left "on" or switched to be "on" only to make the objects 144 visible when (or at some time during when) the backlight assembly 130 is operated in the second or unlit and transparent operating state. This accounts for light being rapidly switched in synchrony with a display but only when content is fully displayed (e.g., to account for a rolling shutter). The objects 144, though, appear to the viewer 115 to be visible concurrently with the displayed content 128 due to the rapid (120 to 144 fps or faster) switching of the display element 120 and backlight assembly 130.

The display system 100 further includes a display controller 150 that operates as shown to operate the display element 120 and backlight assembly 130 in a switched manner with control signals 164, 165 and 166. The controller 150 may take many forms to implement the display system 100 such as a computer or computing device with a processor(s) 152 that manages operations of input and output devices 154 (e.g., a display, a keyboard, a touchscreen, a mouse, a touchpad, one or more depth cameras, and the like) to allow an operator to provide input such as to select first state content 158 and/or masks 159.

The processor 152 also executes code or runs software to provide programs including a switching module 160 that generates the control signals 164, 165, and 166 that may be synchronized with a synchronizing module 162 such that the first operating states and the second operating states wholly or partially overlap for the display element 120 and backlight assembly 130. The processor 152 also manages memory or data storage devices 156 such as by storing and retrieving digital data. This data may include, as shown, first state content 158 and second state masks 159, and this data may be included in the control signals 164 to define the displayed content 128 (and black or non-displaying portions of the panel 122) and the displayed masks 129 (and white or transparent areas of the panel 122).

The content 158 and masks 159 are typically paired together such that the displayed mask 129 has a position, size, and shape on the panel 122 that matches the position, size, and shape of an object in the displayed content 128. The content and mask pair may stay the same over time or one or more different pair may be displayed by the display element 120 during operations of the display system 100 to provide one or more differing 3D effects or displays for the viewer 115 (with the same or differing/changing 2D and/or 3D objects 144 and/or lights 146 in the background display space 140). The control signals 164 generated by the switching module 160 will include or define the content 158 and the masks 159 while the control signals 165 typically turn the lighting sheet or element 132 on and off (switch between a lit state and an unlit and transparent state). Control signals 166 may turn the background lighting 146 on and off.

It is preferred that the control signals 164, 165, and 166 are synchronized such that the first operating state of the display element 120 coincides (partially or wholly overlaps) with the first operating state of the backlight assembly 130 and the background lights 146 and such that the second operating state of the display element 120 coincides (partially or wholly overlaps) with the second operating state of the backlight assembly 130 and the background lights 146. The switching module 160 may act to switch between the two operating states at a switching speed of 120 to 144 fps or faster, and a synchronizing mechanism 162 may be provided to time the switching and issuance of the control signals 164, 165, and 166 to achieve the desired amount of overlap of the operating states in the display element 120, backlight assembly 130, and background lights 146. For example, the backlight assembly 130 may operate more slowly (or switch less rapidly) than the display panel 122, and the synchronizing mechanism 162 may be used to delay or otherwise time the issuance of the control signals 164 to the display element 120 so that the display element 120 displays the masks 129 (and otherwise provides transparent areas/regions) whenever the lighting sheet or element 132 is unlit and transparent. An example of one implementation of the switching module 160 and the synchronizing mechanism 162 of a controller 150 are discussed below but other specific implementations will be apparent to those skilled in the display device and/or electronics arts (e.g., configured to account for rolling shutter of a display device).

FIGS. 2A-2C illustrate, respectively, front perspective views of a display system 200A, 200B, and 200C operating in a first state (or State A), in a second state (or State B), and with rapid switching between the first and second states (State A to State B to State A to State B and so on over an operating period). FIG. 2A shows the display system 200A operating in a first state (or State A) and showing with a front perspective view what would be observed by a viewer 204 in a viewing space in front of the system 200A. The display system 200A includes a display element 210A with a structural frame 212 supporting a display panel or screen 214 with a front surface facing the viewer 204 and a back or rear surface facing away from the viewer 204 (e.g., facing toward backlight assembly 220A). In the shown first operating state, the display element 210A (e.g., a transparent LCD) is operating to display content 216 in a center portion of the panel 214 and to be blank (or black) in other non-displaying regions or areas 218. In this example, the content 216 is made up of an object in the form of a soccer ball with a streaking wave or rainbow extending from the soccer ball.

The display system 210A further includes a backlight assembly 220A that includes an edge lit particle-embedded plastic sheet 222 and a sheet or panel 224 that provides or acts as a shutter (e.g., a ferroelectric shutter or switchable smart glass). For example, the sheet 222 may take the form of an ultraviolet (UV) light emitting diode (LED) edge-lit fluorophore-embedded acrylic sheet, with the UV LEDs distributed around the edge of the sheet of the fluorescent plastic. UV light launched into the edges of the plastic sheet are confined and guided by total internal reflection to travel within and be distributed across the plastic sheet. UV-activated fluorophores mixed with the acrylic/plastic produce visible light that is emitted out the face or front surface (surface facing toward the display panel 214) of the plastic sheet 222, which creates a bright, evenly luminous surface. When the UV LEDs are turned off (switched to a second operating state or State B), the fluorphores do not emit light and are transparent so that the plastic sheet 222 is transparent as shown in FIG. 2B. The display system 210A also may include a background light system 240 positioned and/or aimed to illuminate the background and background objects 230.

In this first operating state (or State A) of the backlight assembly 220A (which coincides in time with the first operating state or (State A) of the display element 210A), the backlight assembly 220A is operating as a backlight for the absorptive display panel 214 to display or illuminate the content 216. To this end, the smart glass panel 224 is operated to be opaque while the lighting sheet 222 is operated to generate light that is transmitted outward from surface 223 facing or adjacent to (or abutting in some cases) the back surface or side of the display panel 214. The light-emitting surface 223 typically will be the same general shape and size as the panel 214 to provide light to all of the back surface of the display panel 214 (when an edge lighting assembly (not shown in FIGS. 2A-2C) is operated to direct light (typically white light) into the edges of the sheet 222) such that the content 216 may be displayed at any location on the panel 214. The display system 200A further includes a background object 230 such as a physical 3D object (with a box shown in FIG. 2A), and background object 230 is not visible to the viewer 204 in the first operating state of the display system 200A because the backlight assembly 220A is operating as an opaque backlight (e.g., with the smart glass sheet or panel 224 in an opaque mode) and/or the background light 240, operating in its first state, is turned off.

FIG. 2B illustrates the same display system 200B but while it is operating in a second operating state (or State B). In this operating state, the display element 210B is operating with the display panel 214 displaying a mask 217 at a location corresponding to the object of the content 216 such as in the center of the panel 214, and the mask 217 is displayed in this example with black pixels but grayscales (or even color) may be used to define opacity of the displayed content 216 on a pixel-by-pixel basis. Other regions or areas 219 of the display panel 214 (which may correspond with the non-display (or non-content displaying) areas/regions 218 of the first operating state of the display element 210) are shown in operation to be transparent (or provided by white pixels in a transparent LCD).

Concurrently, the backlight assembly 220B is operated in a second state (or State B) with the edge lit particle-embedded sheet 222 operated so as to be non-luminous or unlit, which causes it to become transparent (e.g., translucent to transparent to light depending on the quality and design of the sheet 222). In this second operating state of backlight assembly 220B, the smart glass sheet 224 is operated to be "off" or transparent to light. The background lighting may also be operated in its second operating state, with its lights "on" and illuminating the background and background objects 230. In this second operating state of the backlight assembly as shown in FIG. 2B, the background object 230 is visible to the viewer 204 through the backlight assembly 220B (all areas of the smart glass sheet 224 and sheet 222) as well as through the transparent areas/regions 219 of the display panel 214 that are not being used to display or provide the mask 217.

FIG. 2C illustrates the display system 200C operating in a mode where it is (or, more accurately, the display panel and backlight assembly are) switched back and forth between the two operating states of FIGS. 2A and 2B. The switching is rapid such as at 120 Hz (or fps) or faster such that the viewer 204 perceives the 3D effect or display as shown in FIG. 2C. Particularly, the viewer 204 perceives the content 216 on the front surface or side of the display panel 214 with the mask 217 so that the content 216 appears to be opaque (or to have an opacity as defined by the opacity of the pixels of the mask 217). Concurrently, the areas/regions 218 and 219 of the display panel 214 appear to the viewer 204 to be transparent as does the backlight assembly 220C such that the viewer 204 can see the background object through the areas/regions 218 and 219 and the components 222, 224 of the backlight assembly 220C (e.g., via light reflected or emitted from the surfaces of the physical background object). The background and background objects 230 appear to be constantly and consistently lit (without flicker). Proper occlusion of the object 230 is provided by the object in the displayed content 216 via the mask 217, and the viewer 204 may move about to different viewing locations and viewing angles in the space in front of the display system 200C without damaging the quality of the 3D effect provided by the display system 200C.

As shown in FIGS. 2A-2C, a luminous transparent display with optical alpha can be implemented through the use of a combination of a fast frame rate ($\geq$120 fps) transparent LCD panel and a synchronized switching transparent backlight.

The switching transparent backlight is chosen and configured to controllably and quickly change from being luminous and opaque/scattering to being non-luminous and transparent. During operation, the display is controlled so as to rapidly and continuously alternate between the two operating states.

In the first mode or operating state (e.g., state of FIG. 2A), the transparent LCD panel displays color content while the transparent backlight is concurrently luminous (and ideally opaque or scattering to the background as may be achieved with a sheet of smart glass as shown in FIG. 2A). Non-luminous pixels are displayed black on the LCD panel (opaque and absorbing) and do not pass the backlight nor background light. In the second mode or operating state (e.g., state of FIG. 2B), the transparent LCD panel switches and displays a silhouette mask of the content on a transparent field while the transparent backlight concurrently switches to its transparent non-luminous state. Transparent LCD pixels are displayed as white, opaque pixels are displayed as black, semi-transparent pixels are displayed as grey, and colored semi-transparent pixels appear tinted. When rapidly alternating between the two modes or operating states such as at 120 Hz or a greater switching rate or speed, the luminous content and the masked background light/objects visually combine without flicker. One useful innovation identified and developed to create the luminous transparent display with optical alpha is the rapid switching between the luminous content and masked transparent modes.

Additionally, though, the display systems achieve the desired 3D effect or display by providing a switching transparent backlight, and a variety of transparent backlights may be used, with the edge lit embedded-particle sheet being just one useful example. With that in mind, it may be useful to describe several other types of transparent backlights that the inventor developed and prototyped for use in a display system of the present description (e.g., in place of the edge lit embedded-particle sheet and smart glass sheet assembly 220A-220C shown in FIGS. 2A-2C). Each of the backlight assemblies described can be rapidly switched from being transparent and non-luminous to being opaque/scattering and luminous.

Figure 3:
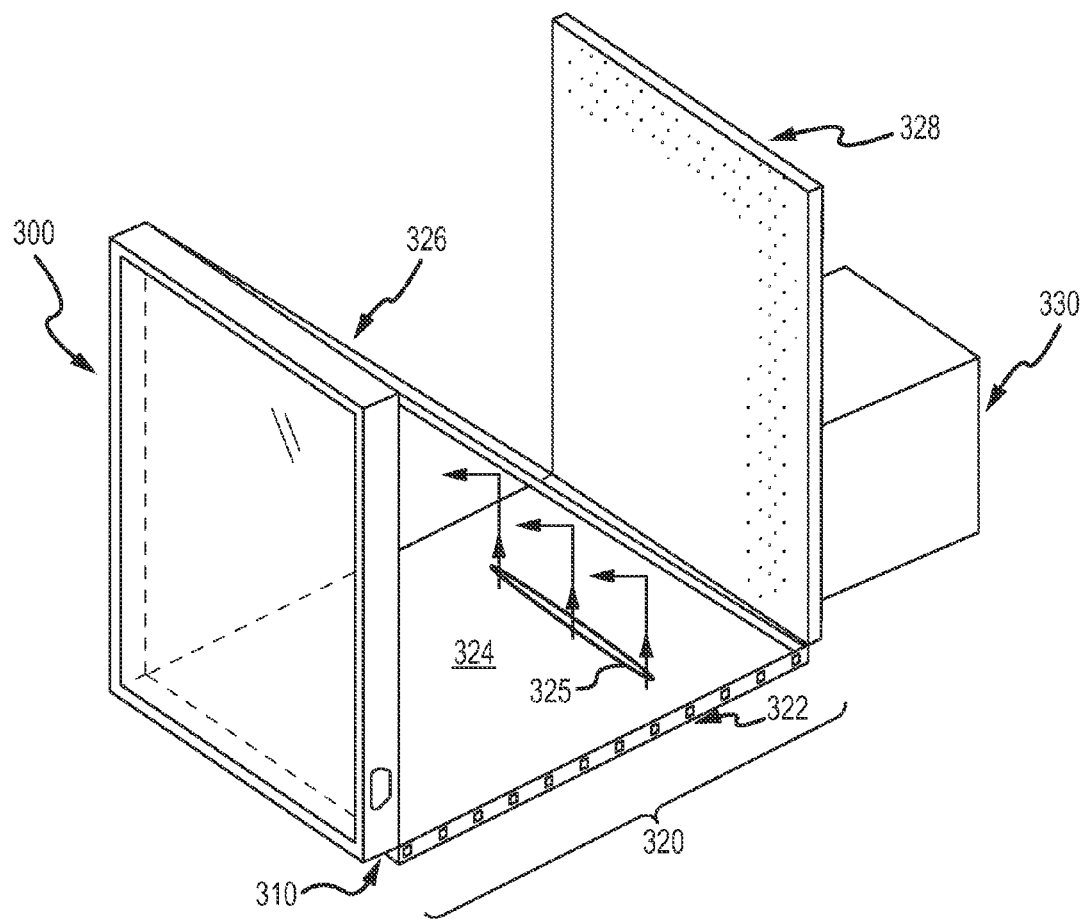
FIG. 3 illustrates a display system with an alternative backlight assembly from that used in the display system of FIGS. 2A-2C.

FIG. 3 illustrates another embodiment of a display system 300 of the present description that includes an absorptive, transparent display element 310 (e.g., a transparent LCD or the like) along with a background object 330 that can be viewed through the display element 310 during rapid switching operations (e.g., through areas of a panel or screen of display element 310 that are not masked). Sandwiched between the object 330 and the display element 310 is a backlight assembly 320 providing similar functionality (e.g., rapid switching between being transparent and non-luminous to being opaque/scattering and luminous) as assembly 220A-220C but using differing components.

Particularly, as shown, the backlight assembly 320 includes a lighting sheet or element 322 such as an edge lit particle-embedded plastic sheet or the like that is positioned generally orthogonal to the panel/screen of the display element 310. The lighting sheet 322 is planar and extends outward from a back surface of the display element such as from an edge of the display panel/screen, with the lighting sheet 322 shown to extend outward from the back surface of the panel of the display element along its lower edge/side. The backlight assembly 320 also includes a sheet or panel 328 of smart glass or switchable glass, and the smart glass panel 328 is positioned to be spaced apart a distance from the back surface of the panel/screen of the display element 310 and to be parallel or substantially parallel to the display panel/screen (e.g., to extend upward from an edge of the lighting sheet 322 that is opposite the edge of the lighting sheet 322 from which the display panel of display element 310 extends as shown in FIG. 3). A beam splitter 326 is positioned between an upper or inward-facing surface 324 of the lighting sheet 322 and an inner or inward-facing surface of the smart glass panel 328, e.g., to extend in a plane that bisects the angle defined between the lighting sheet 322 and the smart glass panel 328 (such as a 45 degree plane as shown).

In the operating state shown in FIG. 3, the smart glass panel 328 is opaque such that the object 330 is not viewable through beam splitter 326 and the display panel 310 (which would typically be operated to display content (not shown) in this mode). Concurrently, the lighting sheet 322 is operated to be luminous by transmitting light 325 from the surface 324 toward a proximate surface of the beam splitter 326 where it is reflected as shown to strike the back surface of the display panel/screen of the display element 310 to provide it with backlighting. In a next operating mode (not shown), the lighting sheet 322 is turned off or is unlit (or non-luminous) to halt transmission of backlight 325, the display panel of element 310 is operated to be transparent except where a mask is displayed with a set of pixels (that define opacity of the previously displayed content), and the smart glass panel 328 is switched to be in a transparent state such that a viewer would be able to see through the display panel of element 310, through the beam splitter 326, and through the smart glass panel 328 to view the object 330 (which often will be illuminated with background lighting (not shown in FIG. 3)).

As shown in FIG. 3, one useful backlight assembly makes use of a beam-combiner combined with a smart glass panel. The beam-combiner (e.g., a 45° half-silvered mirror) can be used to direct light from the background scene or from an opaque backlight unit (e.g., the lighting sheet 322 that may be an edge lit particle embedded plastic sheet, a large LED array backlight panel, a second monitor, or the like) to a transparent LCD panel. A smart glass panel is placed behind the beam splitter. When the backlight unit is lit, light is redirected illuminating the LCD panel's color content, and the smart glass is made scattering so as to diffuse the background scene. When the backlight unit is unlit and the LCD panel is displaying the content mask, the smart glass panel is made clear, thus making the masked background scene visible.

Figure 4:
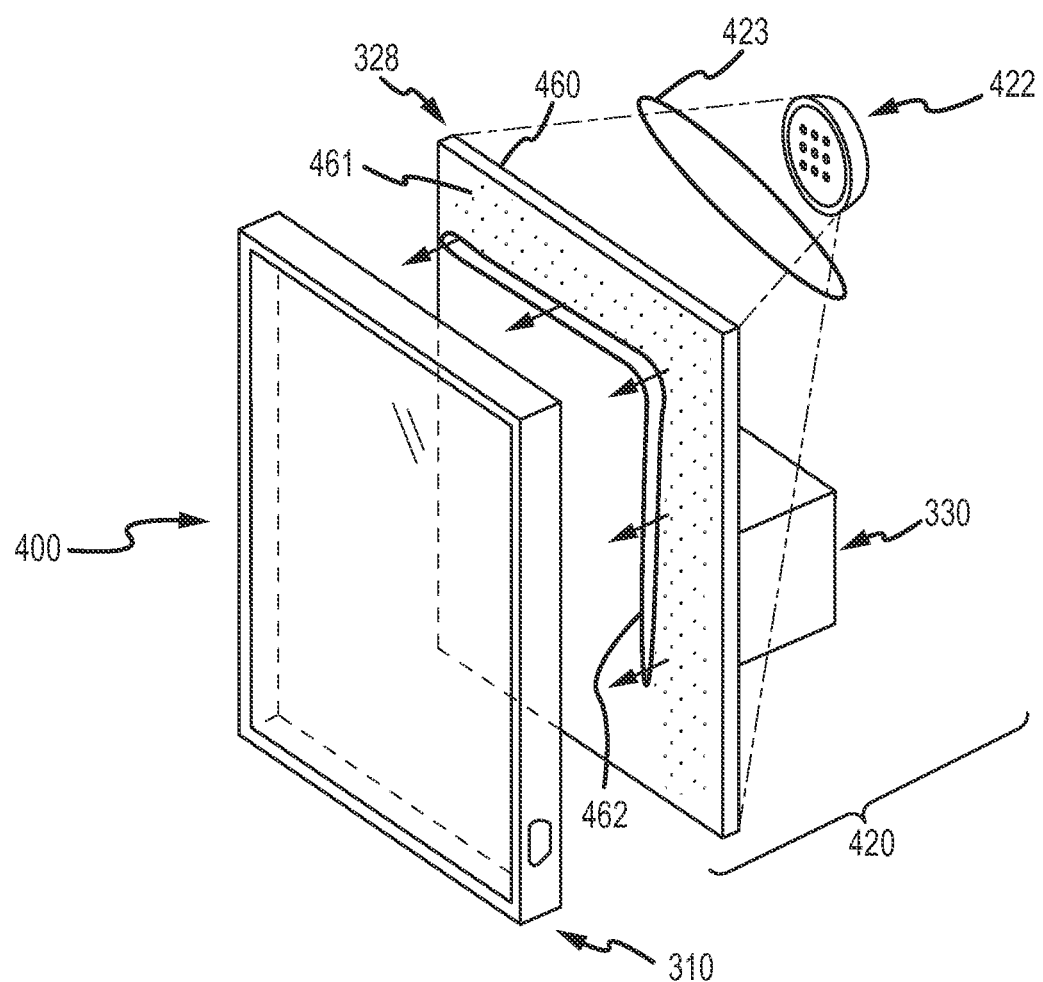
FIG. 4 illustrates, similar to FIG. 3, a display system with another exemplary backlight assembly.

FIG. 4 illustrates another display system 400 that includes the display element 310 and background object 330 of the system 300 but makes use of an alternative backlight assembly 420. Particularly, the backlight assembly 420 includes the smart glass or switchable glass panel 328 that may be positioned and operated as in display system 300 of FIG. 3. However, to provide backlighting of display element 310 in a switching manner, the backlight assembly 420 includes a light source 422 that can be turned on or lit in one operating mode (shown in FIG. 4) to provide light 423 and in another mode to be turned off or unlit (or non-luminous).

The light source 422 may, for example, be an LED spotlight, and its output 423 is directed onto a back surface 460 of the smart glass panel 328 that is concurrently operated to be transparent such that light 462 is transmitted from the front (or display panel-facing) surface 461 toward the back surface of the display panel of display element 310 to provide backlighting, e.g., when the display panel is operating to display content (not shown in FIG. 4 but understood from FIGS. 1-2C). In the other operating state (not shown), the light source 422 is unlit so no light 423 is provided, the smart glass panel 328 is operated to be transparent to allow viewing of the background object 330, and the display panel of element 310 is operated to display a mask associated with previously displayed content and to otherwise be transparent to light from the background object 330 and smart glass panel 328.

As shown, the display system 400 can be formed using a projected switching scattering liquid crystal panel. Particularly, in one embodiment, a scattering smart glass screen (PDLC) is used and operated to switch from being transparent to scattering and vice versa. Projected light from modified LED flood spotlights (PAR38 distributed by Philips Lighting or the like) evenly illuminates the smart glass when the LCD panel displays color content and the smart glass is in a scattered state. In contrast, no light is projected onto the liquid crystal screen by the LED flood spotlights when the LCD panel displays the mask and the smart glass is transparent. In another embodiment, the smart glass is edge lit with LED strips when the smart glass is scattering and unlit when the smart glass is transparent.

With the backlight assemblies of FIGS. 1-4 understood, it will be apparent the concepts for a display system can be implemented with other backlight assemblies adapted to provide similar functionality. The inventor implemented and tested use of the backlight assembly of FIGS. 2A-2C in the form of an LED edge lit particle-embedded clear plastic sheet with a backing sheet of switchable smart glass, and the following discussion of a specific implementation of a display system includes this backlight assembly design. However, the backlight assembly may also use one of the embodiments of FIGS. 3 and 4, an edge-lit quad-lenticular configuration, a transparent OLED-lighting panel, or other backlight assembly design that provides the switching functions described herein. Each of the various backlight assemblies is similar in implementation in display, synchronization, and switching, and they differ mainly in the details of illumination.

In some applications, it may be useful to provide a backlight assembly using a quad-lenticular backlight with a switching smart glass panel (not shown in a separate figure but will be readily understood based on FIGS. 2A-4 and the illustrated backlight assemblies). A quad-lenticular is a stack of four lenticular sheets that acts as an afocal relay, which results in a clearly visible background view through the stack, e.g., with the sheets arranged to be behind and parallel to the display panel (e.g., a transparent LCD panel).

To make a transparent backlight, LEDs (or other edge-lighting sources) are distributed around the edge of the quad-lenticular to inject light into the stack (in the backlighting mode or state). Internal reflection guides light to travel within the stack and to be distributed across the lenticular sheets. The light inside the stack may exit and be diffused by the lenticules (or elongate/linear lenses) producing even lighting across the face or outer surface of the stack. When the LEDs are turned off, a clear image of the background is visible through the quad-lenticular sheet.

In addition, the backlight assembly includes a smart glass panel that is located behind the stack (distal side relative to the display panel of the display element), and the smart glass panel is operated to switch synchronously with the LED edge-lit quad-lenticular stack. The smart glass panel is set or switched to scattering when the LEDs are turned on ("lit" or luminous), further diffusing the background (behind both the stack and the smart glass panel) so as to ensure a luminous and scattering/opaque backlight state. The smart glass panel is set or switched to transparent when the LEDs are turned off (unlit or non-luminous) so the background can be seen through both the quad-lenticular stack and the smart glass panel.

At this point in the description, it may be useful to discuss more fully one prototyped display system, its operations to provide proper synchronized operation of its components during rapid switching between the two operating states, and how the new display system may be used to provide an impactful display or 3D effect.

Particularly, the inventor demonstrated display operations as taught herein with a prototype display system that included a 27-inch Asus™ VG278HE, 144 Hz-capable monitor that was modified to provide a transparent display panel by removing its backlight and diffuse anti-glare film. To provide a backlight assembly, two stacked 15-inch×24-inch pieces of particle embedded acrylic material (a sheet of ACRYLITE® LED light guiding edge lit (Endlighten) distributed by Acrylite) were placed flush behind the matching-size monitor/display panel and were edge lit using several backlight LED strips (distributed by Samsung) arranged on all edges. An additional 15-inch×24-inch of PLDC smart glass (smart glass distributed by The LTI Group or the like) is placed behind the particle embedded acrylic material. Various PLDC formulations were tested and one specifically capable of switching from transparent to clear (or vice versa) at 60 to 144 Hz was chosen. A HPZ800 workstation with a Quadro 2000 graphics card (nVidia) running Bino stereoscopic 3D movie player was used to take an over-under content/mask image and output openGL quad-buffered frame-sequential 1080p alternating content and mask pair at 144 fps over a DVI-link. It was recognized, though, that a custom openGL program to create the quad-buffered 144 fps frame sequential content/mask output could also be written for a real-time interactive display.

Figure 5:
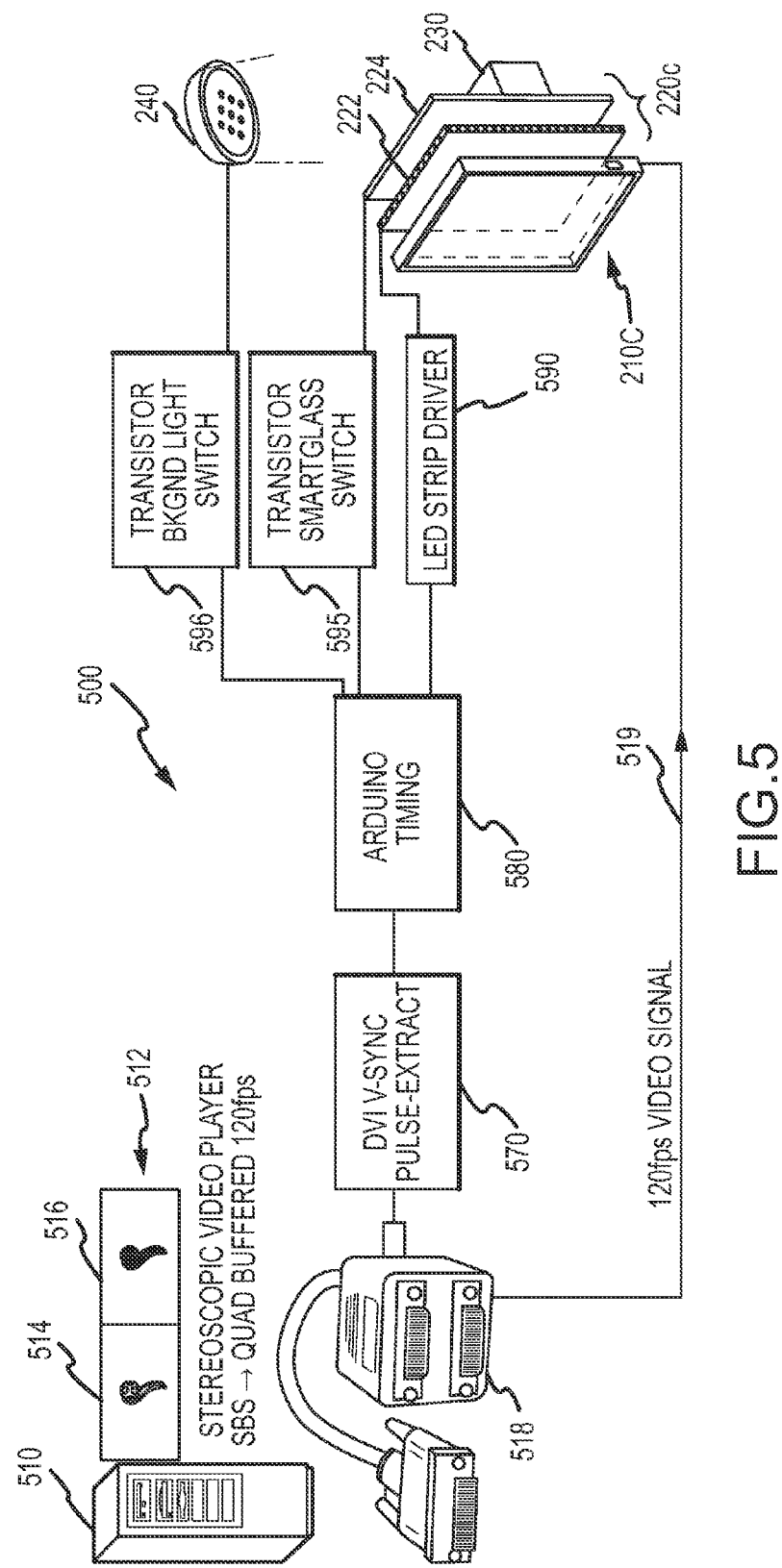
FIG. 5 illustrates a display assembly including components of the display assembly of FIGS. 2A-2C and showing additional controller details.

FIG. 5 illustrates a display assembly 500 including components of the display assembly 210C of FIGS. 2A-2C and showing additional controller details. Particularly, the display assembly 500 is shown to include the display element 210C, the backlight assembly 220C with its edge lit particle-embedded sheet 222 and smart glass panel 224, and the background object 230 (which are being operated in a switched manner). Further, though, the display system 500 is shown to include a controller that includes a computer/computing device 510 that operates to generate and deliver a video signal (control signal) 519 to the display element 210C via connector 518. The video signal 519 is generated from an image pair 512 that alternates between a content image 514 and a mask image 516, and these are delivered to a display panel of element 210C in a rapidly switching manner.

The controller of display system 500 further includes modules to provide pulse extraction at 570 and to provide timing functionality 580 based on the extracted pulse by module 570. The output of the timing module 580 is used as input by an LED strip driver 590 to operate the LEDs (or other edge lighting source) around the lighting sheet 222 in a rapidly switching manner to act to switch the sheet 222 from a lit (or on) state to an unlit (or off) state in synchronization with operation of the display element 210 based on video signal 519. Likewise, the output of the timing module 580 is used as input by transistor switch 595 for the smart glass panel 224 to switch it back and forth between opaque and transparent states in synchronization with the delivery of the images 514, 516 in video signal 519. The output of the timing module 580 may also be used as the input by a transistor switch 596 for an LED floodlight 240 illuminating background object 230 to turn on/off in synchrony with the transparent and opaque states of the smart glass panel 224.

Figure 6:
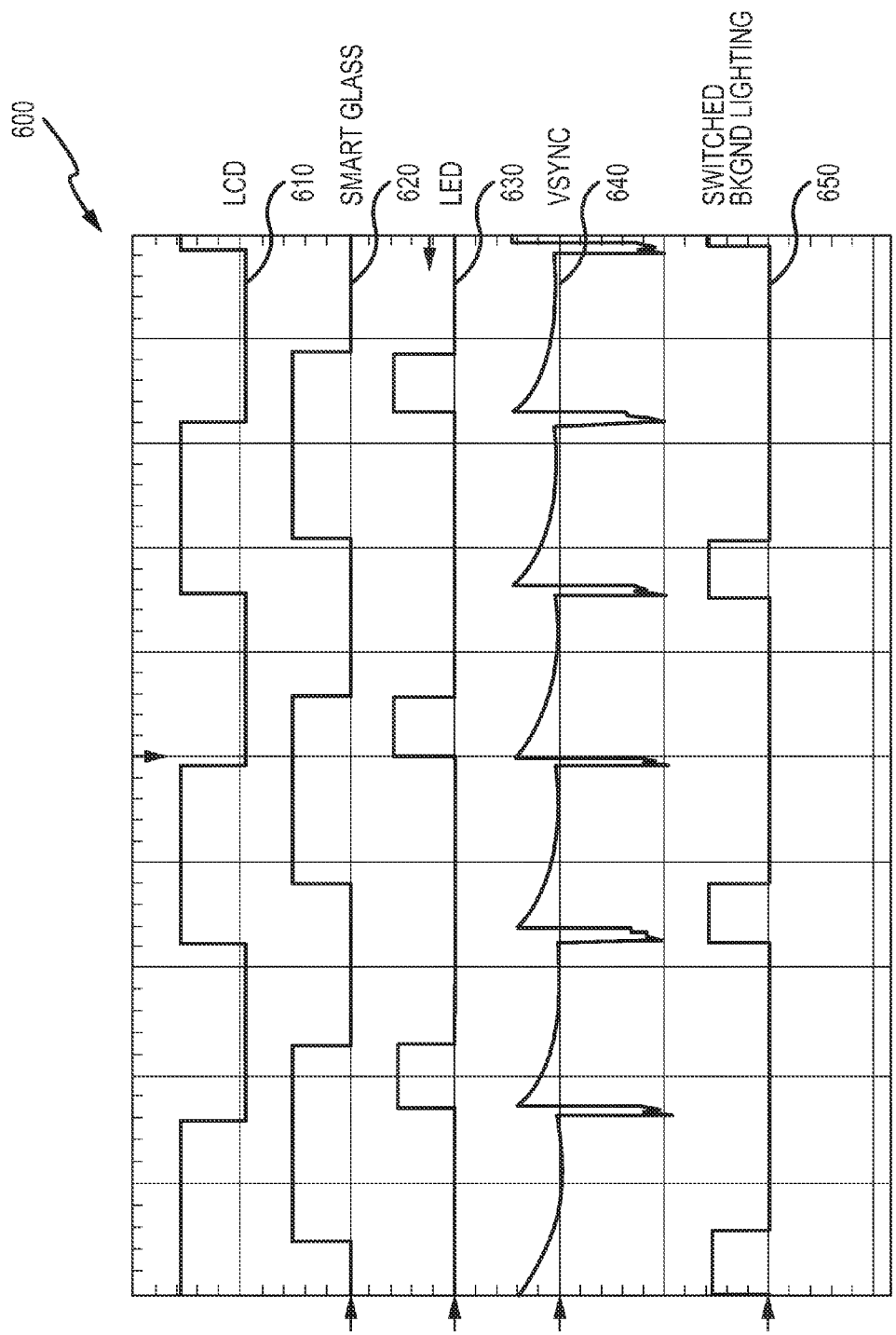
FIG. 6 is a graph showing synchronization of control signals in more detail (such as by the controller or control components of FIGS. 1 and 5).

The controller provided in display system 500 may be adapted to account for display panel (e.g., liquid crystal display panel) and smart glass PDLC transition times as these components 210C and 224 do not switch immediately on and off (not instantaneous switching between states). FIG. 6 provides a graph 600 showing a comparison of the timing (along the X-axis) of the delivery of the various control signals (LCD/display panel signals with line 610, smart glass panel control signals with line 620, LED/edge lighting control signals with line 630, the vsync signal with line 640, and the background lighting with line 650) to provide proper synchronization of the operations of the display system components to properly operate in State A and State B (or first and second operating states) in a concurrent or at least partially overlapping manner. From the graph 600, it can be seen that the backlight assembly is operated to flash or provide backlighting only when content is displayed, and this will typically not result in a fifty operation (not lit 50 percent of the time and unlit 50 percent of the time).

In the prototype display system (which may be implemented as shown for the system 500 of FIG. 5), the display, transparent backlight, and smart glass were synchronized via the display's vertical synchronization (vysnc) signal. A passive DVI splitter (as shown with connector 518 in FIG. 5) was used to route one video output to the transparent monitor (e.g., transparent LCD) and to route the other to a custom DVI vsync extractor (as shown with module 570 in FIG. 5). Then, an Arduino microcontroller (as shown with module 580 in FIG. 5) was used to take the extracted vsync pulse as an input trigger to two toggles and, in response, to output two 72 Hz square waveforms each with adjustable phases and duty-cycles. One square wave was input to a transistor (as shown with switch 595 in FIG. 5) switching a +/−65 V voltage applied to the PDLC sheet to make it scattering or shorting the PDLC inputs to clear. Another square wave was connected to the enable pin of the LED strips' controllers (as shown with driver 590 in FIG. 5) to control the transparent backlight illumination.

When the display was presenting content, the PDLC sheet was scattering, the transparent backlight was illuminated, and the background spotlight was turned off. The PDLC sheet scattering helped diffuse and veil a bright background (from ambient light) which otherwise may have appeared through the illuminated transparent backlight. When the display was presenting the silhouette mask, the PDLC was clear, the transparent backlight was not illuminated, and the background was illuminated. Phasing and duty cycle differences in the PDLC signal and the LED strip were used, as shown in the graph 600 in FIG. 6, to account for transition times in the LCD display and the PDLC sheet, so backlight illumination only occurred when the LCD image fully filled the screen and the PDLC had fully transitioned to its scattering state and to illuminate the background only when the LCD mask fully filled the screen and the PDLC had fully transitioned to its clear state.

Testing of the prototype display system showed that it was very useful for displaying an image on the transparent display to provide opaque content on a transparent field. Due to the rapid switching at 144 fps in the prototype display system, the content appeared solid (e.g., as shown for content/mask 216, 217 in FIG. 2C) and flicker was not evident. The content on the display panel was high contrast and opaque against the bright background. The masked content object (e.g., a shield in one prototype implementation that included text) exhibited deep solid blacks, the whites in the text were emissive and opaque, and concurrently the transparent field about the masked content was clear without any apparent hazing or milky appearance. Because the same display panel presents both content and mask, they are inherently aligned. The background was brightly lit to address the inherent attenuation of light through the LCD panel and due to the switching scheme (e.g., content only displayed half of the time). Many use cases for the prototyped display system may involve placing virtual characters in physical sets, and, in such applications, the background lighting can also be controlled to provide well-lit background objects or physical sets.

In review, with the display systems described herein, the inventor has created and demonstrated a medium-sized compact transparent display system capable of producing high-contrast opaque dynamic content on a transparent field. In one embodiment, the display system used high speed switching of a 144 fps transparent display and a switching transparent/opaque backlight built using modified commodity hardware. The content/mask switching scheme provides per-pixel independently controllable luminance, color, and opacity. This switching scheme also provides a practical process for addressing optical transparency in a display using standard RGB video signals. Unlike other proposed displays, this display exhibits inherent alignment between mask and content, is free of Moiré or parallax effects, and avoids the difficulty of manufacturing, alignment, and synchronization of a separate addressable per-pixel backlight or additional "multi-mode" opacity control layer.

Although the switching scheme can be used with a variety of proposed transparent backlights, the inventor has also introduced and prototyped several existing and new types and designs for useful backlight assemblies. The switching scheme even improves the performance of displays using previously proposed transparent backlights. The added control of the display's appearance using optical transparency allows new visual and creative effects, such as a compact Pepper's Ghost or futuristic looking displays.

The display can also be made interactive by adding sensors (capacitive, structure light, time of flight, microphone arrays, resistive touch screens) to provide feedback of user touch, gesture, location, or pose to control and modify the content/mask. One such sensing mode that can be effectively hidden with such a display is structured infrared (IR) light and/or time of flight using infrared light. The LCD panel used for the content and mask is transparent to infrared light, even when displaying content, as the display's polarizers do not affect infrared light. Thus, infrared structured light can be projected and detected from behind the transparent LCD panel, hidden from the viewer, to sense depth and gestures away from the screen, as well as to detect multi-touch interactions (depth at the screen) on a pixel level (rather than just 1-10 touch points). In some cases, the sensing may be gated and synchronized with the backlight (such as when scattering in the smart glass panel occurs, as that may affect depth sensing). In other cases, though, it will not be necessary, such as when the smart glass panel is not used in the backlight assembly or when the smart glass panel is sufficiently displaced from the transparent LCD to allow viewing through the transparent LCD but not through the smart glass panel.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Embodiments of the subject matter described in this specification can be implemented as one or more computer program products, i.e., one or more modules of computer program instructions encoded on a computer-readable medium for execution by, or to control the operation of, data processing apparatus. For example, the modules used to provide the applications or modules 160, 162 or other applications/programs in the controller 150 in FIG. 1 or controller (components/structure shown with elements 510, 518, 570, 580, 590, 595, and 596) of display system 500 in FIG. 5 may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The term computer system that uses/provides the display control method/processes (including synchronizing switching operations and generating/communicating control signals) encompasses all apparatus, devices, and machines for processing data, including by way of example a programmable processor, a computer, or multiple processors or computers. The display systems can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to update buffer queuing and garbage collection) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described herein.

For example, FIG. 1 is a block diagram illustrating one embodiment of a display system 100 configured to implement the methods described herein. In different embodiments, system 100 (and its display controller 150) may be or include any of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (with an I/O portion 154 of display controller 150 or the like), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

I claim:

1. A display system, comprising:
    a display element including a non-emissive display panel;
    a backlight assembly; and
    a display controller operable to switch operations of the display element between first and second operating states and to switch operations of the backlight assembly between first and second operating states,
    wherein the non-emissive display panel displays content in the first operating state of the display element and displays a mask for the content in the second operating state of the display element,
    wherein the backlight assembly is luminous in the first operating state of the backlight assembly to direct light onto a surface of the non-emissive display panel and is transparent in the second operating state of the backlight assembly,
    wherein the backlight assembly is opaque during the first operating state of the backlight assembly,
    wherein the backlight assembly includes a smart glass panel that is controlled to be opaque in the first operating state of the backlight assembly and to be transparent in the second operating state, wherein the backlight assembly further includes an edge lit particle-embedded plastic sheet positioned between the surface of the non-emissive display panel and the smart glass panel, and wherein the edge lit particle-embedded plastic sheet is operable to be luminous in the first operating state of the backlight assembly and to be transparent in the second operating state of the backlight assembly.

2. The display system of claim 1, wherein the controller synchronizes switching of the operations of the display element and the backlight assembly whereby the first operating states of the display element and the backlight assembly at least partially overlap and the second operating states of the display element and backlight assembly at least partially overlap.

3. The display system of claim 1, further comprising a background object positioned for viewing through both the non-emissive display panel and the smart glass panel in the second operating states of the display element and the backlight assembly.

4. The display system of claim 1, wherein the non-emissive display panel comprises a transparent liquid crystal display (LCD).

5. A display system, comprising:
a display element including a non-emissive display panel;
a backlight assembly; and
a display controller operable to switch operations of the display element between first and second operating states and to switch operations of the backlight assembly between first and second operating states,
wherein the non-emissive display panel displays content in the first operating state of the display element and displays a mask for the content in the second operating state of the display element,
wherein the backlight assembly is luminous in the first operating state of the backlight assembly to direct light onto a surface of the non-emissive display panel and is transparent in the second operating state of the backlight assembly,
wherein the backlight assembly is opaque during the first operating state of the backlight assembly,
wherein the backlight assembly includes a smart glass panel that is controlled to be opaque in the first operating state of the backlight assembly and to be transparent in the second operating state,
wherein the smart glass panel is spaced apart and parallel to the surface of the non-emissive display panel,
wherein the backlight assembly includes a quad-lenticular stack between the smart glass panel and the surface of the non-emissive display panel, and
wherein the quad-lenticular stack is edge lit causing the quad-lenticular stack to be luminous in the first operating state of the backlight assembly and to be non-luminous in the second operating state of the backlight assembly.

6. A display with per-pixel opacity, comprising:
a display panel operable in a first state to display content with a first set of pixels and in a second state to display a mask with at least a portion of the first set of pixels and to be transparent in a second set of pixels differing at least partially from the first set of pixels;
a backlight assembly positioned adjacent a back surface of the display panel, wherein the backlight assembly is operable in a first state to be luminous to light the back surface of the display panel and to be opaque to light from a background space and wherein the backlight assembly is operable in a second state to be transparent to the light from the background space;
a controller generating control signals to operate the display panel and the backlight assembly in synchronization and in a switched manner at a predefined switching rate, whereby the display panel and the backlight assembly at least partially concurrently operate in the first and second states,
wherein the backlight assembly includes a smart glass panel that is controlled to be opaque in the first state of the backlight assembly and to be transparent in the second state of the backlight assembly; and
a background lighting system unlit and not illuminating the background space during the first states of the display panel and the backlight assembly and also operable to transmit light onto surfaces of the background object and space to be viewable during the second states of the display panel and the backlight assembly through the display panel via the second set of pixels and a background light.

7. The display of claim 6, wherein the display panel comprises a transparent LCD panel and the predefined switching rate is at least 120 Hz.

8. The display of claim 6, further comprising a background object in the background space viewable during the second states of the display panel and the backlight assembly through the display panel via the second set of pixels and a background light operable to transmit light onto surfaces of the background object.

9. The display of claim 6, wherein the content is displayed by operating the first set of pixels to display color and the mask is displayed by operating the first set of pixels to display color, gray, or black.

10. The display of claim 6, wherein the backlight assembly further includes an edge lit particle-embedded plastic sheet positioned between the back surface of the display panel and the smart glass panel and wherein the edge lit particle-embedded plastic sheet is operable to be luminous in the first state of the backlight assembly and to be transparent in the second state of the backlight assembly.

11. The display of claim 6, wherein the smart glass panel is spaced apart and parallel to the back surface of the display panel, wherein the backlight assembly includes an edge lit particle-embedded plastic sheet positioned to be transverse to the back surface of the display panel and to be between the back surface of the display panel and the smart glass panel, wherein the backlight assembly also includes a beamsplitter positioned between the smart glass panel and the edge lit particle-embedded plastic sheet, and wherein the edge lit particle-embedded plastic sheet is operable to be luminous in the first state of the backlight assembly and to be transparent in the second state of the backlight assembly.

12. The display of claim 6, wherein the smart glass panel is spaced apart and parallel to the back surface of the display panel, wherein the backlight assembly further includes a light source positioned to direct output light onto a surface of the smart glass panel distal to the back surface of the display panel, and wherein the light source is operated to provide the output light during the first state of the backlight assembly and to be non-luminous during the second state of the backlight assembly.

13. A display with per-pixel opacity, comprising:
a display panel operable in a first state to display content with a first set of pixels and in a second state to display a mask with at least a portion of the first set of pixels and to be transparent in a second set of pixels differing at least partially from the first set of pixels;

a backlight assembly positioned adjacent a back surface of the display panel, wherein the backlight assembly is operable in a first state to be luminous to light the back surface of the display panel and to be opaque to light from a background space and wherein the backlight assembly is operable in a second state to be transparent to the light from the background space; and a controller generating control signals to operate the display panel and the backlight assembly in synchronization and in a switched manner at a predefined switching rate, whereby the display panel and the backlight assembly at least partially concurrently operate in the first and second states, wherein the backlight assembly includes a smart glass panel that is controlled to be opaque in the first state of the backlight assembly and to be transparent in the second state of the backlight assembly, wherein the smart glass panel is spaced apart and parallel to the back surface of the display panel, wherein the backlight assembly includes a quad-lenticular stack between the smart glass panel and the back surface of the display panel, and wherein the quad-lenticular stack is edge lit causing the quad-lenticular stack to be luminous in the first state of the backlight assembly and to be non-luminous in the second state of the backlight assembly.

14. A method for providing a 3D effect, comprising:

with a non-emissive display, displaying content with a set of pixels;

with a backlight assembly during the displaying of the content, backlighting the non-emissive display and, concurrent with the backlighting, blocking light from sources outside the backlight assembly;

with the non-emissive display, displaying a mask for the content using the set of pixels;

with the backlight assembly during the displaying of the mask, transmitting the light from the sources outside the backlight assembly; and switching between the displaying of the content and the displaying of the mask, wherein the backlight assembly includes a ferroelectric shutter performing the blocking and the transmitting steps and also includes an edge lit particle-embedded plastic sheet positioned between the non-emissive display and the ferroelectric shutter performing the backlighting and the transmitting steps.

15. The method of claim 14, wherein the switching is performed at a rate of at least 120 frames per second.

16. The method of claim 14, wherein, during the displaying of the mask, the non-emissive display is operated such that pixels outside of the set of pixels are transparent.

17. The method of claim 14, wherein an IR depth camera is located behind the display aimed towards a viewer and further comprising operating the IR depth camera to provide feedback to the viewer regarding a touch of the viewer, a gesture of the viewer, a location of the viewer, or a pose of the viewer.

18. The method of claim 17, wherein the feedback includes controlling or modifying the content or the mask.

19. A display with per-pixel opacity, comprising:

a display panel operable in a first state to display content with a first set of pixels and in a second state to display a mask with at least a portion of the first set of pixels and to be transparent in a second set of pixels differing at least partially from the first set of pixels;

a backlight assembly positioned adjacent a back surface of the display panel, wherein the backlight assembly is operable in a first state to be luminous to light the back surface of the display panel and to be opaque to light from a background space and wherein the backlight assembly is operable in a second state to be transparent to the light from the background space;

a controller generating control signals to operate the display panel and the backlight assembly in synchronization and in a switched manner at a predefined switching rate, whereby the display panel and the backlight assembly at least partially concurrently operate in the first and second states, wherein the display panel comprises a transparent LCD panel and the predefined switching rate is at least 120 Hz; and a background lighting system unlit and not illuminating the background space during the first states of the display panel and the backlight assembly and also operable to transmit light onto surfaces of the background object and space to be viewable during the second states of the display panel and the backlight assembly through the display panel via the second set of pixels and a background light.

20. The display of claim 19, further comprising a background object in the background space viewable during the second states of the display panel and the backlight assembly through the display panel via the second set of pixels and a background light operable to transmit light onto surfaces of the background object.

21. The display of claim 19, wherein the content is displayed by operating the first set of pixels to display color and the mask is displayed by operating the first set of pixels to display color, gray, or black.

22. A display with per-pixel opacity, comprising:

a display panel operable in a first state to display content with a first set of pixels and in a second state to display a mask with at least a portion of the first set of pixels and to be transparent in a second set of pixels differing at least partially from the first set of pixels;

a backlight assembly positioned adjacent a back surface of the display panel, wherein the backlight assembly is operable in a first state to be luminous to light the back surface of the display panel and to be opaque to light from a background space and wherein the backlight assembly is operable in a second state to be transparent to the light from the background space;

a controller generating control signals to operate the display panel and the backlight assembly in synchronization and in a switched manner at a predefined switching rate, whereby the display panel and the backlight assembly at least partially concurrently operate in the first and second states;

a background object in the background space viewable during the second states of the display panel and the backlight assembly through the display panel via the second set of pixels;

a background light operable to transmit light onto surfaces of the background object wherein the background light is part of a background lighting system unlit and not illuminating the background space during the first states of the display panel and the backlight assembly and also operable to transmit light onto surfaces of the background object and space to be viewable during the second states of the display panel and the backlight assembly through the display panel via the second set of pixels and a background light.

23. The display of claim 22, wherein the content is displayed by operating the first set of pixels to display color and the mask is displayed by operating the first set of pixels to display color, gray, or black.

24. A display with per-pixel opacity, comprising:
a display panel operable in a first state to display content with a first set of pixels and in a second state to display a mask with at least a portion of the first set of pixels and to be transparent in a second set of pixels differing at least partially from the first set of pixels;
a backlight assembly positioned adjacent a back surface of the display panel, wherein the backlight assembly is operable in a first state to be luminous to light the back surface of the display panel and to be opaque to light from a background space and wherein the backlight assembly is operable in a second state to be transparent to the light from the background space;
a controller generating control signals to operate the display panel and the backlight assembly in synchronization and in a switched manner at a predefined switching rate, whereby the display panel and the backlight assembly at least partially concurrently operate in the first and second states,
wherein the content is displayed by operating the first set of pixels to display color and the mask is displayed by operating the first set of pixels to display color, gray, or black; and
a background lighting system unlit and not illuminating the background space during the first states of the display panel and the backlight assembly and also operable to transmit light onto surfaces of the background object and space to be viewable during the second states of the display panel and the backlight assembly through the display panel via the second set of pixels and a background light.

25. A display with per-pixel opacity, comprising:
a display panel operable in a first state to display content with a first set of pixels and in a second state to display a mask with at least a portion of the first set of pixels and to be transparent in a second set of pixels differing at least partially from the first set of pixels;
a backlight assembly positioned adjacent a back surface of the display panel, wherein the backlight assembly is operable in a first state to be luminous to light the back surface of the display panel and to be opaque to light from a background space and wherein the backlight assembly is operable in a second state to be transparent to the light from the background space;
a controller generating control signals to operate the display panel and the backlight assembly in synchronization and in a switched manner at a predefined switching rate, whereby the display panel and the backlight assembly at least partially concurrently operate in the first and second states; and
a background lighting system unlit and not illuminating the background space during the first states of the display panel and the backlight assembly and also operable to transmit light onto surfaces of the background object and space to be viewable during the second states of the display panel and the backlight assembly through the display panel via the second set of pixels and a background light.

26. A method for providing a 3D effect, comprising:
with a non-emissive display, displaying content with a set of pixels;
with a backlight assembly during the displaying of the content, backlighting the non-emissive display and, concurrent with the backlighting, blocking light from sources outside the backlight assembly;
with the non-emissive display, displaying a mask for the content using the set of pixels;
with the backlight assembly during the displaying of the mask, transmitting the light from the sources outside the backlight assembly; and
switching between the displaying of the content and the displaying of the mask,
wherein the switching is performed at a rate of at least 120 frames per second,
wherein an IR depth camera is located behind the display aimed towards a viewer and further comprising operating the IR depth camera to provide feedback to the viewer regarding a touch of the viewer, a gesture of the viewer, a location of the viewer, or a pose of the viewer, and
wherein the feedback includes controlling or modifying the content or the mask.

27. The method of claim 26, wherein, during the displaying of the mask, the non-emissive display is operated such that pixels outside of the set of pixels are transparent.

* * * * *